(12) United States Patent
Backeris et al.

(10) Patent No.: US 12,544,077 B2
(45) Date of Patent: Feb. 10, 2026

(54) DETACHABLE-TIP BALLOON MICROCATHETER FOR EMBOLIZATION OF VASCULAR PATHOLOGY

(71) Applicant: Icahn School of Medicine at Mount Sinai, New York, NY (US)

(72) Inventors: Peter Backeris, New York, NY (US); Kurt Yaeger, New York, NY (US); Anthony Costa, New York, NY (US); Thomas Oxley, New York, NY (US); Alejandro Berenstein, New York, NY (US); Young Joon Kwon, New York, NY (US); Joe Borrello, New York, NY (US)

(73) Assignee: Icahn School of Medicine at Mount Sinai, New York, NY (US)

( * ) Notice: Subject to any disclaimer, the term of this patent is extended or adjusted under 35 U.S.C. 154(b) by 1164 days.

(21) Appl. No.: 17/425,539

(22) PCT Filed: Jan. 31, 2020

(86) PCT No.: PCT/US2020/016208
§ 371 (c)(1),
(2) Date: Jul. 23, 2021

(87) PCT Pub. No.: WO2020/160469
PCT Pub. Date: Aug. 6, 2020

(65) Prior Publication Data
US 2022/0183698 A1 Jun. 16, 2022

Related U.S. Application Data

(60) Provisional application No. 62/799,409, filed on Jan. 31, 2019.

(51) Int. Cl.
*A61B 17/12* (2006.01)
*A61L 24/06* (2006.01)
(Continued)

(52) U.S. Cl.
CPC ............. *A61B 17/12186* (2013.01); *A61B 17/12031* (2013.01); *A61B 17/12109* (2013.01);
(Continued)

(58) Field of Classification Search
CPC ...... A61M 2025/1054; A61M 25/0074; A61M 25/1036; A61M 39/10; A61B 17/12186;
(Continued)

(56) References Cited

U.S. PATENT DOCUMENTS

| | | | | |
|---|---|---|---|---|
| 4,119,099 | A | * 10/1978 | Patel ................... | A61M 25/10 604/920 |
| 4,433,973 | A | * 2/1984 | Kurtz .................. | A61M 39/10 604/905 |
| 4,793,351 | A | 12/1988 | Landman et al. | |
| 5,158,548 | A | 10/1992 | Lau et al. | |
| 5,634,901 | A | 6/1997 | Alba et al. | |
| 5,951,513 | A | 9/1999 | Miraki | |

(Continued)

OTHER PUBLICATIONS

European Search Report in EP Application No. 20748620.0-1122/3917606, mailed Sep. 23, 2022 (9 pages).

*Primary Examiner* — Nilay J Shah
(74) *Attorney, Agent, or Firm* — Leason Ellis LLP

(57) ABSTRACT

A detachable tip sheathed balloon microcatheter is provided for delivering an embolic agent to a target location for the embolization of an arteriovenous malformation (AVM). The detachable tip sheathed balloon microcatheter including a balloon microcatheter including a first shaft and an inflatable balloon that is coupled to a distal end portion of the first shaft; and a detachable tip assembly that is configured to be detachably coupled to the first shaft of the balloon microcatheter. The detachable tip assembly includes a protective balloon sheath that is coupled to a proximal end portion of the second shaft, wherein when the detachable tip assembly is coupled to the balloon microcatheter, the protective balloon sheath surrounds at least a portion of the inflatable balloon.

23 Claims, 11 Drawing Sheets

(51) Int. Cl.
*A61M 25/00* (2006.01)
*A61M 25/10* (2013.01)
*A61B 17/00* (2006.01)

(52) U.S. Cl.
CPC ......... *A61L 24/06* (2013.01); *A61M 25/0021* (2013.01); *A61M 25/0074* (2013.01); *A61M 25/10* (2013.01); A61B 2017/00862 (2013.01); A61B 2017/12054 (2013.01); A61M 2025/0004 (2013.01); A61M 2025/0042 (2013.01); A61M 2025/105 (2013.01); A61M 2025/1081 (2013.01); A61M 2205/0216 (2013.01)

(58) Field of Classification Search
CPC .... A61B 17/12031; A61B 2017/12054; A61B 17/12109
See application file for complete search history.

(56) References Cited

U.S. PATENT DOCUMENTS

| | | | |
|---|---|---|---|
| 6,733,474 B2* | 5/2004 | Kusleika | A61M 25/104 604/101.02 |
| 2001/0029362 A1 | 10/2001 | Sirhan et al. | |
| 2003/0093086 A1* | 5/2003 | Briggs | A61M 25/104 604/103.05 |
| 2003/0220666 A1 | 11/2003 | Mirigian et al. | |
| 2003/0229366 A1* | 12/2003 | Reggie | A61F 2/95 623/1.12 |
| 2004/0039332 A1* | 2/2004 | Kantor | A61M 25/0023 604/528 |
| 2006/0135947 A1 | 6/2006 | Soltesz et al. | |
| 2008/0033476 A1 | 2/2008 | Greene | |
| 2010/0049165 A1 | 2/2010 | Sutherland et al. | |
| 2012/0197194 A1 | 8/2012 | Osypka | |
| 2017/0245864 A1 | 8/2017 | Franano et al. | |

* cited by examiner

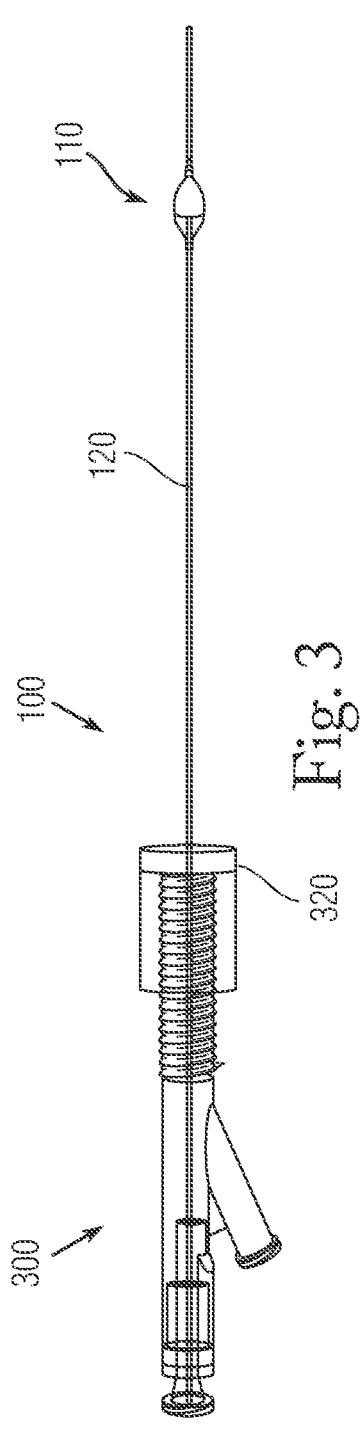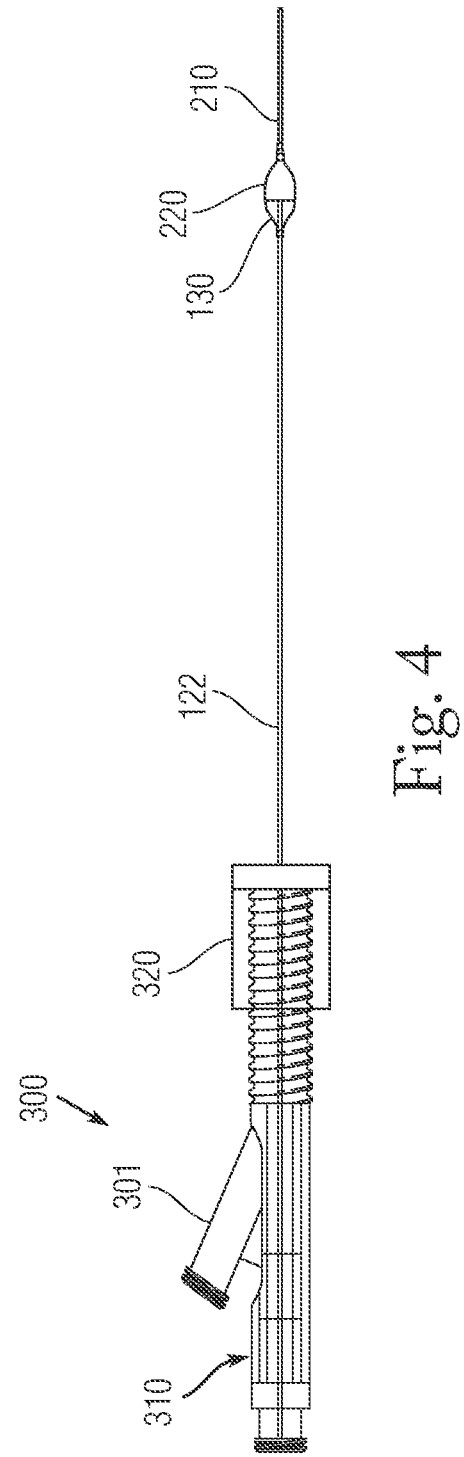

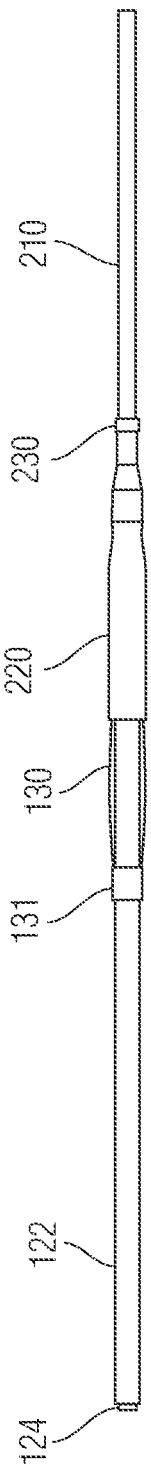
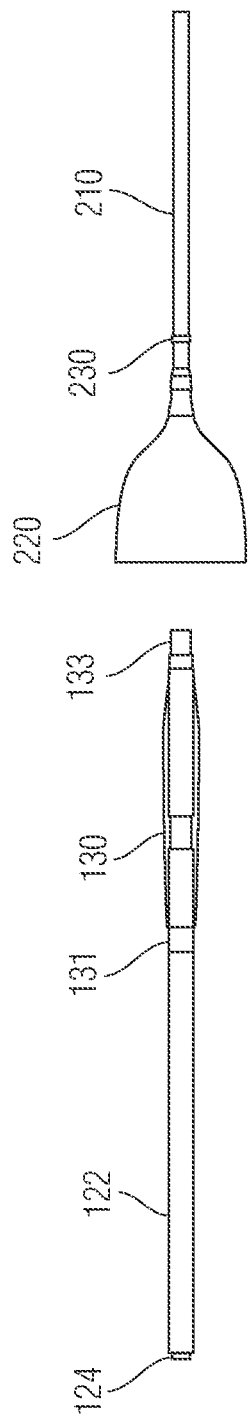
Fig. 5
Fig. 6

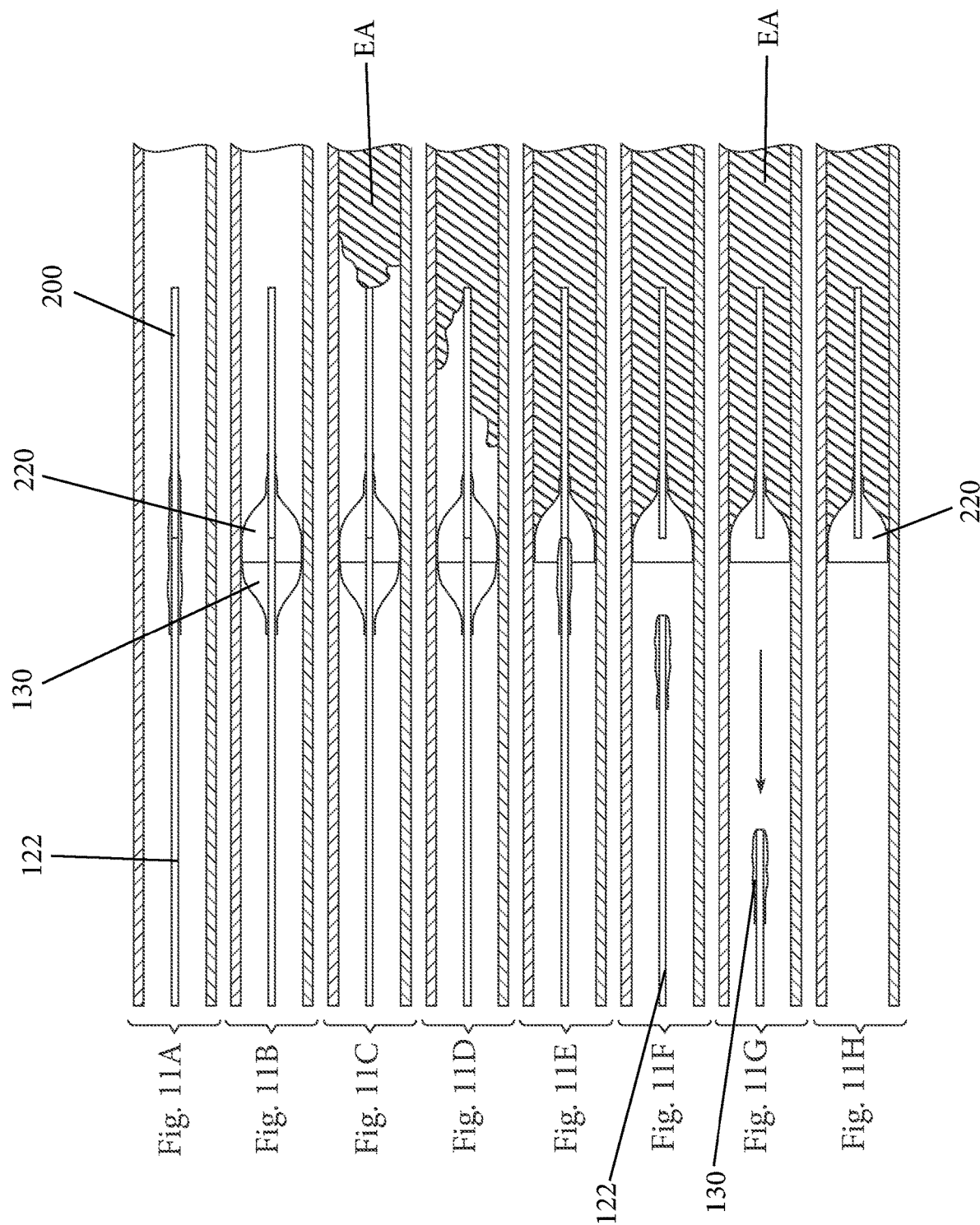

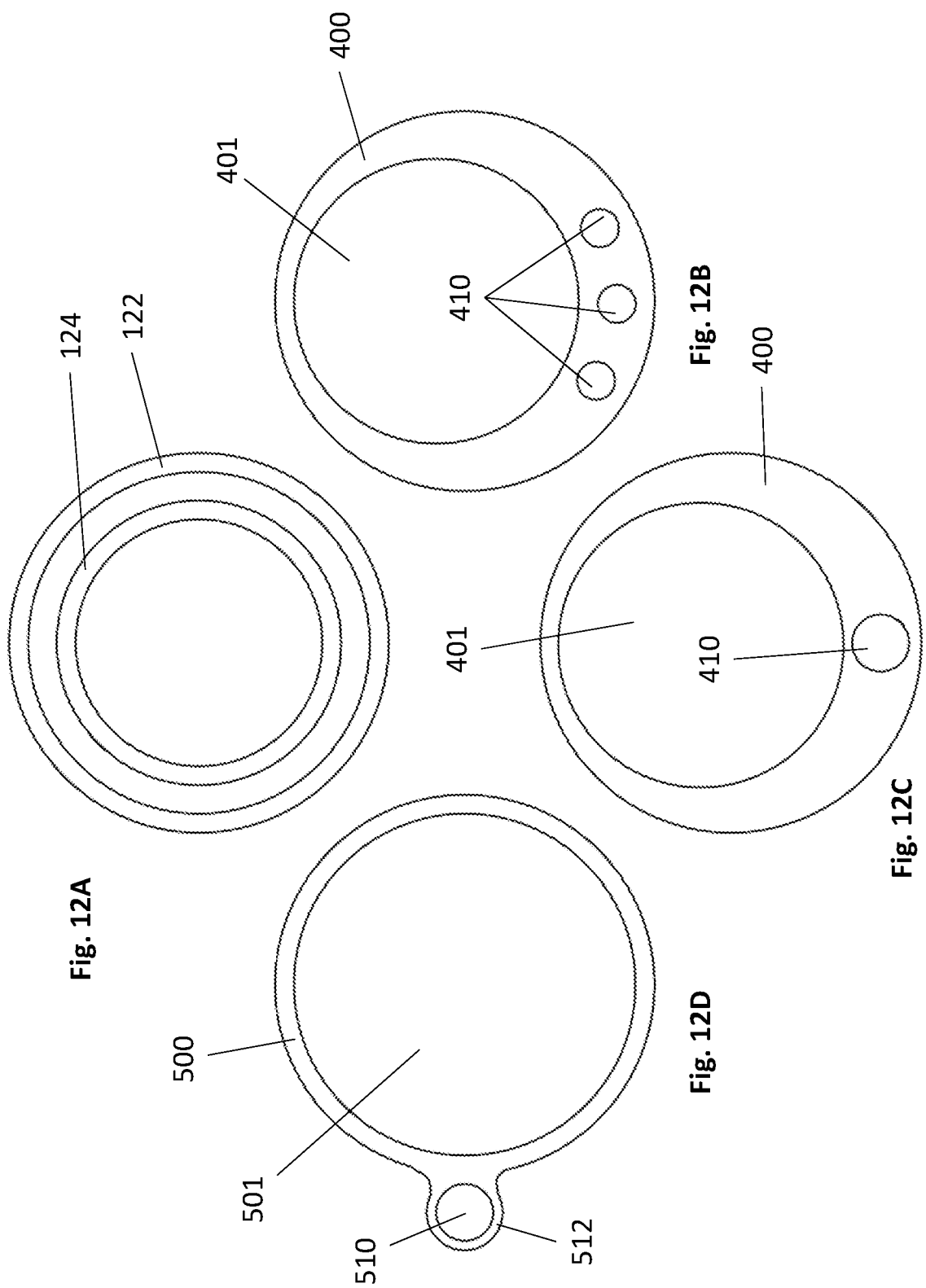

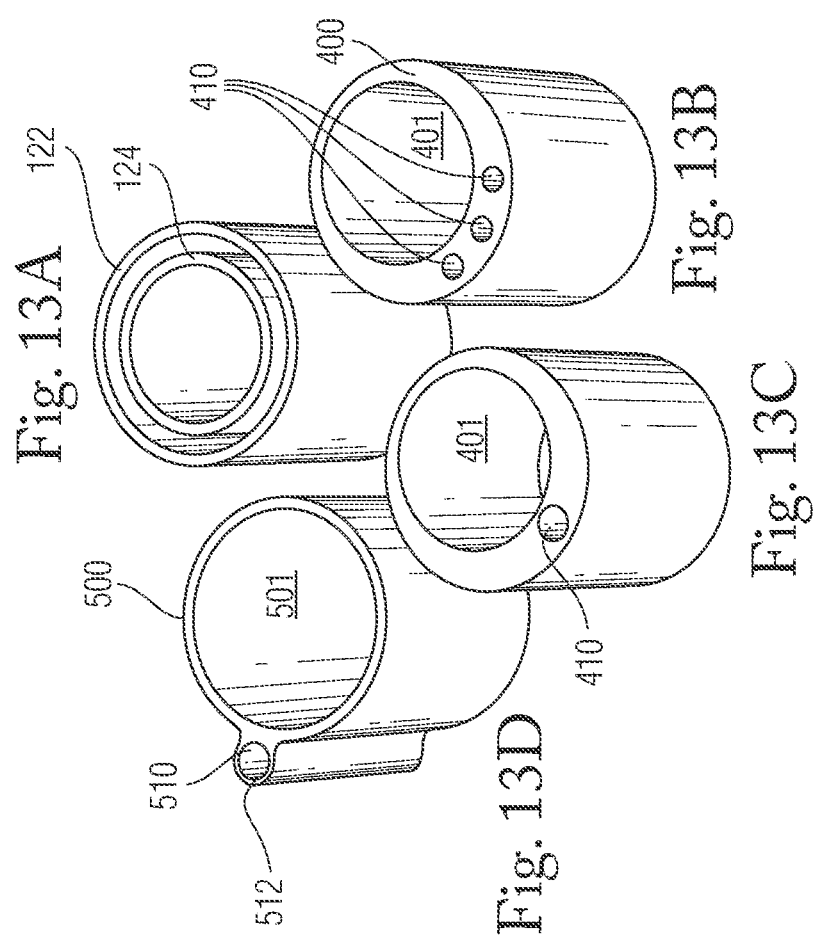

DETACHABLE-TIP BALLOON MICROCATHETER FOR EMBOLIZATION OF VASCULAR PATHOLOGY

CROSS REFERENCE TO RELATED APPLICATION

The present application is a U.S. National Phase Application under 35 U.S.C. § 371 of International Patent Application No. PCT/US2020/016208, filed Jan. 31, 2020, which claims priority to and the benefit of U.S. patent application No. 62/799,409, filed Jan. 31, 2019, each of which are incorporated by reference herein as if expressly set forth in their respective entirety herein.

TECHNICAL FIELD

The present invention relates to surgical devices and methods of treatment and more particularly, relates to a detachable-tip balloon microcatheter for embolization of vascular territories.

BACKGROUND

Vascular pathologies include, but are not exclusive to vascular tumors, vessel injuries, aneurysms, arteriovenous malformations (AVM), and arteriovenous fistulas (DAVF). AVMs are abnormal vascular anomalies that predispose to end-organ hemorrhage and flow-related ischemia. AVMs are characterized by a complex network of arteries and veins connected by one or more fistulae and as such, AVMs and DAVFs lack a true capillary network.

AVMs are ubiquitous throughout the body, occurring in virtually every organ system, but have highest incidence in the brain and spinal cord. In an AVM, high-flow arteries feed into a complex nidus and drain into high-capacity veins depriving tissue from normally regulated blood flow. Given these flow anomalies, AVMs are associated with vascular hypertension within the AVM nidus and draining veins, and, given this shunting effect, relative hypotension in the surrounding normal vessels. AVMs can remain clinically silent for long periods of time but may cause headaches, seizures, focal neurological deficits. Due to venous hypertension and other high flow-related effects, AVM vessels can rupture, causing a devastating hemorrhage. Furthermore, in the pediatric population, a high arterial flow of an AVM can shunt significant blood from other organ systems, causing a high-output cardiac failure.

In the USA alone, the prevalence of AVM is around 10.3 per 100,000 population and the incidence is 1.1 per 100,000 person-years. Mortality and morbidity associated with intracranial AVM rupture is 10% and 20%-30% respectively. Vascular malformations may also produce various neurological manifestations such as seizures or neurological deficits. The treatment paradigms for AVM/AVF are complex, and include a combination of endovascular embolization, surgical resection, and radiation therapy. The goal for AVM embolization is complete occlusion of abnormal arteriovenous fistulae, using an embolic agent or device such as liquid embolic agents, or solid embolic agents, such as particulates, coils, occluding plugs, and balloons. Effective embolization requires advanced manual dexterity to catheterize the desired location. For AVMs specifically, the interventionalist must achieve a precise injection that penetrates the entire malformation before the liquid embolic material hardens.

Given the relatively low procedural morbidity with endovascular techniques (compared to surgical resection), AVM embolization is typically first-line therapy and is the process of delivering an artificial embolic agent to completely occlude the AVM and can be followed by microsurgical resection or surgery (e.g., radiosurgery) if deemed amenable. s Currently, liquid embolization is technically conducted using two different type of embolic agents, some adhesive and some non-adhesive; and different classes of catheter: non-detachable catheters, detachable-tip microcatheters, and balloon microcatheters.

Embolic Agents

Embolic agents frequently utilized are liquids, particulates, coils, occluding plugs, and balloons. Some embolic agents have a short lived action such as collagen and gelfoam, whereas others, like glue or coils, are permanent. Liquid embolic agents include, Onyx™, alcohol, ALGEL, and Phil™. N-Butyl Cyanoacrylate (NBCA, glue) has also been utilized as a permanent embolic agent. NBCA is diluted with Ethiodol and tantalum. NBCA displays a fast polymerization rate when exposed to the ionic environment of blood. Ethiodol is used as vehicle and a polymerization retardant. Onyx™, a mixture of ethylene alcohol vinyl polymer (EVOH), dimethyl sulfoxide (DMSO) and tantalum powder for radiopaque visualization, has been approved by the FDA for embolization of cerebral AVMs.

The solvent for Onyx™ embolization is dimethyl sulfoxide (DMSO). DMSO prevents Onyx premature hardening in the catheter. During the embolization procedure the clinician injects DMSO when the catheter is in position. Consequently, Onyx is injected, moving the column of DMSO towards the distal catheter tip. When Onyx comes in contact with blood, DMSO diffuses away and the hardening process begins. In contrast with NBCA, Onyx™ requires DMSO compatible catheters. NBCA is an adhesive agent and Onyx™ is cohesive and non-adhesive, acting like lava and displaying progressive solidification and cohesiveness hardening from the inside out. Importantly, due to its cohesive nature, Onyx allows for slower injection times. However, both Onyx and glue can induce entrapment of the catheter in the vessel if not used properly.

Due to the tortuous nature of AVMs, the rate of complete obliteration of the lesion is approximately 20% and complications may result as architecturally complex AVMs require a greater level skill by the interventionalist. AVMs are dynamic structures with multiple arterial feeders. Embolization of one feeder inevitably affects blood flow in adjacent feeders as well as the pressure at the nidus; abrupt changes in pressure at the nidus increase hemorrhage risk. The angioarchitecture of the AVM determines the concentration of Onyx and embolization success requires selection of the Onyx™ product with the appropriate viscosity. After selection of the Onyx product and DMSO catheter pretreatment, the clinician must identify the best position of the catheter tip with respect to the AVM nidus to optimize treatment; inadequate penetration of the nidus will lead to ineffective embolization, in turn, over-penetration may increase nidus pressure leading to hemorrhage. The clinician must deliver the embolic agent at the precise rate and speed to achieve maximal penetration of the nidus while preventing excessive reflux. Generally, an accepted level of reflux is 1 to 2 cm. When deciding the embolizing agent delivery rate, the clinician must balance the need to provide a comprehensive embolization of the AVM while considering adjacent vasculature or distal compromise to the venous drainage of the nidus. Onyx injection occurs in two phases:

the injection phase and the rest phase, each lasting between 30 and 120 seconds. Faster injection times can cause reflux, angionecrosis, and vasospasm, whereas longer resting phases might cause unintentional occlusion of the catheter. A clinician must decide when to stop the embolization and remove the catheter to avoid entrapment or fracturing the cast created by the embolic agent. The risk of catheter entrapment is 4% for Onyx embolization. With current techniques, precise timing of actions during embolization is critical to limit complications. Given these factors, achieving a complete endovascular cute rate is rare. Thus, while endovascular embolization is safer and less morbid than surgery, surgical resection has traditionally been considered curative, and endovascular treatment adjuvant.

The following items have been identified as areas needing improvement during embolization: 1) reducing embolic agent reflux (which is associated with stroke risk); 2) reducing force for detachment following embolization; 3) increasing speed of embolization procedures resulting from continuous embolization, (thereby improving nidus penetration and reducing the chance of complication); 4) reduced risk of catheter entrapment; and, 5) reduced procedure cost (due to reduced need for other single-purposed catheters); 6) improved health outcomes (given the shorter procedural time and less time under anesthesia); 7) reduced radiation exposure.

The most commonly utilized microcatheters in the market utilize glue and/or Onyx and are either in the form of detachable-tip microcatheters or non-detachable tip balloon microcatheters.

Detachable-Tip Microcatheters

The detachable-tip microcatheter was developed as a solution to potential catheter entrapment during use of non-adhesive DMSO-compatible liquid embolic agents such as Onyx, Squid or PHIL, and can be used for better embolization with adhesive liquid embolic agents such as IBCA or NBCA. The main feature of detachable tip microcatheter is that the distal section of the catheter incorporates a detachment zone that allows separation of the catheter when the catheter main body is retracted. There are currently two available detachable tip microcatheter systems for embolization in the market: the SONIC™ (BALT, Montmorency, France, not approved by the FDA and not available in the USA) and the Apollo™ (Medtronic).

Both the Apollo™ and SONIC™ microcatheters utilize radiopaque marker bands to visualize position in the vasculature and the length of detachment zone. The clinician utilizes the markers to estimate the extent of reflux relative to the length of the detachment zone. The available detachable tip lengths are available between 15 mm and 50 mm Both microcatheters are DMSO compatible. In the SONIC microcatheter, the connecting portion of catheter and detachable tip is DMSO soluble and therefore dissolves after injection of DMSO and embolic agent. In the Apollo microcatheter, detachment is achieved by gentle retraction of the main catheter body. The Apollo system tip detaches with a minimal, atraumatic force of 33 grams. Detachable-tip microcatheters are advantageous in situations where successful embolization would result in a significant cast around the tip of the catheter. As previously described, successful utilization of the detachable-tip microcatheters requires the formation of a plug proximal to the microcatheter tip before the Onyx or other embolic agent can move forward towards the AVM nidus. This allows the proceduralist to inject embolic material with enough velocity to occlude distal segments. In microcatheters without a detachable tip, reflux control depends on operator expertise to prevent catheter entrapment in the Onyx cast. However, the introduction of microcatheters with a detachable tip allows proceduralists to incorporate the catheter injection lumen into the Onyx proximal plug, permitting faster injection velocities of the embolic agent.

Balloon Catheters

Balloon microcatheters optimize flow control in liquid embolization procedures. Compared to detachable-tip microcatheters, balloon assisted embolization allows more precise delivery of embolization agents preventing reflux and spillage of the embolic agent into non-target vessels. The Scepter C™ and the Scepter XC™ (Microvention, Inc, Tustin CA USA) are DMSO compatible, and thus can be used for embolization with Onyx. However, they incompatible for use with NBCA, given the glue's adhesive interaction with catheters. The Scepter C™ and the Scepter XC™ are two of the more commonly used balloon microcatheters for liquid embolization procedures. However, there are other balloon microcatheters, such as the Balt Extrusions Eclipse catheter, that are not FDA approved for use in the US. Balloon microcatheters are coaxial, double-lumen access microcatheters that are DMSO-compatible and hydrophilic-coated. The double lumen allows for concurrent inflation of the balloon and delivery of liquid embolic agents or coils. The tip length is shorter, measuring approximately 5 mm Radiopaque markers located at the distal catheter tip and the distal balloon end indicate the length of the catheter tip.

The balloon portion of the Scepter C acts as a plug to ensure flow control of the embolic agent from another, adjacent microcatheter into an AVM nidus. The proximal plug created by balloon inflation decreases the procedure time required by detachable-tip microcatheters, as it obviates the need to create an obstructive Onyx™ cast. However, it has been observed that unwanted retrograde flow or reflux of Onyx can still occur requiring the clinician to increase the size of the balloon or to temporarily stop the injection procedure. Furthermore, as previously described, retrograde flow of Onyx™ can potentially lead to catheter entrapment.

Dual Microcatheter Techniques

Today, many embolization procedures are conducted with a dual microcatheter technique, leveraging the advantages of both the detachable-tip and balloon microcatheters. This combination technique is used for both transarterial and transvenous AVM embolization. In this technique, the two microcatheters are advanced alongside each other. The balloon microcatheter is inflated to provide distal flow control and proximal reflux prevention. The detachable-tip microcatheter is advanced more distally into the nidus. Subsequently, a plug is created by the distal catheter, either with metal coils or Onyx. Nidus embolization is then achieved using the more distal detachable-tip microcatheter. When the Onyx cast hardens, the tip is detached, the balloon is deflated, and both catheters are removed. This technique requires more operator experience and surgical time compared to a single microcatheter technique but leads to a safer procedure and a more completely embolized AVM.

The advantage of balloon microcatheters versus non-balloon microcatheters, is the ability of balloons to arrest flow, and prevent reflux of a liquid embolic agent. The advantage of a detachable tip is its ability to be used with adhesive agents that permanently bind with the catheter but can be detached from the catheter body following injection.

In non-detachable tip microcatheters, after reaching the target, an occlusive embolic plug must be initially formed at the inflow vessel for proximal flow control and prevention of embolic material reflux into normal vasculature. Comparatively, inflation of a proximal balloon microcatheter allows improved flow control, such that injection of embolic agent can better perfuse the malformation. However, these catheters can become embedded in the embolic agent cast, requiring significant mechanical force for removal. This tension force can dislodge the cast or avulse small perforating blood vessels leading to ischemic end-organ complications.

SUMMARY

In accordance with the present invention, a medical device (instrument) for embolization incorporates the features of a microcatheter combining balloon expansion and tip detachability.

A detachable-tip balloon microcatheter offers several benefits to patients, healthcare payers, and clinicians: 1) reduced embolic agent reflux during embolization (which is associated with increased complication risk); 2) reduced force for detachment following embolization; 3) Increasing speed of procedures; 4) reduced procedure cost (due to reduced need for other single-purposed catheters and double catheter techniques); 6) improved health outcomes (given the shorter procedural time and lower anesthesia and radiation requirements); and 7) improved penetration and likelihood of total occlusion of the vascular abnormality.

In accordance with one embodiment, a detachable tip sheathed balloon microcatheter for delivering an embolic agent to a target location. The detachable tip sheathed microcatheter includes a balloon microcatheter including a first shaft and an inflatable balloon that is coupled to a distal end portion of the first shaft; and also includes a detachable tip assembly that is configured to be detachably coupled to the first shaft of the balloon microcatheter. The detachable tip assembly includes a protective balloon sheath that is coupled to a proximal end portion of the second shaft and moves between a collapsed state and an expanded (extended) state. The detachable tip assembly is coupled to the balloon microcatheter and the protective balloon sheath surrounds at least a portion of the inflatable balloon during the embolization procedure.

BRIEF DESCRIPTION OF THE DRAWING FIGURES

FIG. 3 is a side perspective view of a detachable-tip balloon microcatheter system including the detachable tip sheathed balloon microcatheter of FIG. 1 and the proximal hub detachment mechanism;

FIG. 4 is another side view of the detachable-tip balloon microcatheter system;

FIG. 5 is a side view of the detachable tip sheathed balloon microcatheter in a delated state;

FIG. 6 is an exploded view of the deflated balloon microcatheter with the detachable tip assembly being shown detached from the main catheter portion;

FIGS. 11A-11H shows exemplary steps for transarterial or transvenous embolization of AVMs using the proposed novel device mechanism;

FIGS. 12A-12D are cross-sectional views of alternative detachable tip sheathed balloon microcatheters; and FIGS. 13A-13D are perspective views of the alternative detachable tip sheathed balloon microcatheters of FIGS. 12A-12D.

DETAILED DESCRIPTION OF CERTAIN EMBODIMENTS

As will be readily understood in view of the preceding discussion concerning the deficiencies of the traditional commercially available devices for performing embolization of AVMs or other vascular pathologies, the present invention is directed to a device that overcomes those deficiencies, and more particularly, to a single-body, detachable-tip balloon microcatheter system (assembly) 100 for transarterial and transvenous embolization of AVMs or other vascular pathologies. The detachable-tip balloon microcatheter system 100 is configured to arrest flow and prevent reflux and reduce surgery time by promoting a more continuous and comprehensive embolization while reducing radiation exposure, risks and procedural complications. In addition, and as described in more detail below, the detachable, balloon-protective sheath permits the use of balloons with tissue adhesive embolic agents, such as NBCA, which is not possible with current, unprotected balloon microcatheters. The technology described in the present application represents a significant improvement over the currently available solutions by incorporating a balloon, a detachable tip segment, and a balloon-protective sheath. As described herein, the detachable-tip balloon microcatheter system 100 achieves these objectives.

As described in detail herein, the detachable-tip balloon microcatheter system 100 has the following advantageous technical features: 1) a detachable tip with covering sheath that protects the balloon from interaction with the embolic agent and facilitates the formation of an embolic cast. The sheath can be physically constructed as a super-elastic thin-walled tube that surrounds a portion of the balloon while being fixed to the detachable tip catheter; and 2) distal tip detachment mechanism: the detachable tip is press-fit into the balloon microcatheter lumen to make contact with a separate inner catheter. A novel sliding retract-release mechanism in the proximal hub operated by the surgeon retracts the balloon catheter while keeping the inner-catheter and detachable tip fixed, causing the atraumatic release of the tip (with minimal strain on the vessels).

FIGS. 1-11 illustrate the detachable balloon microcatheter system 100 that includes several components (parts) that mate together to form the assembled system 100. In particular, the detachable balloon microcatheter system 100 includes a detachable tip sheathed balloon microcatheter 110 that is formed of a first part 120 in the form of a detachable balloon microcatheter that also can be considered to be a proximal part of the detachable tip sheathed balloon microcatheter 110 and a second part that is discussed in more detail and can be considered to be a distal part of the detachable tip sheathed balloon microcatheter 110. The first and second parts of the detachable tip sheathed balloon microcatheter 110 are shown separated from one another in the exploded view of FIG. 6.

Figure 1:
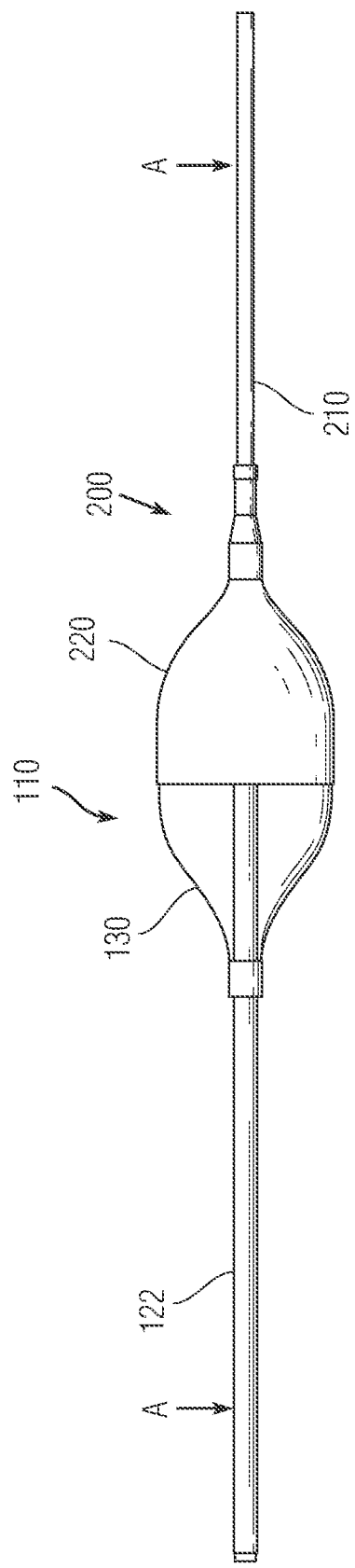
FIG. 1 is a side elevation view of a detachable tip sheathed balloon microcatheter according to one exemplary embodiment.
Figure 2:
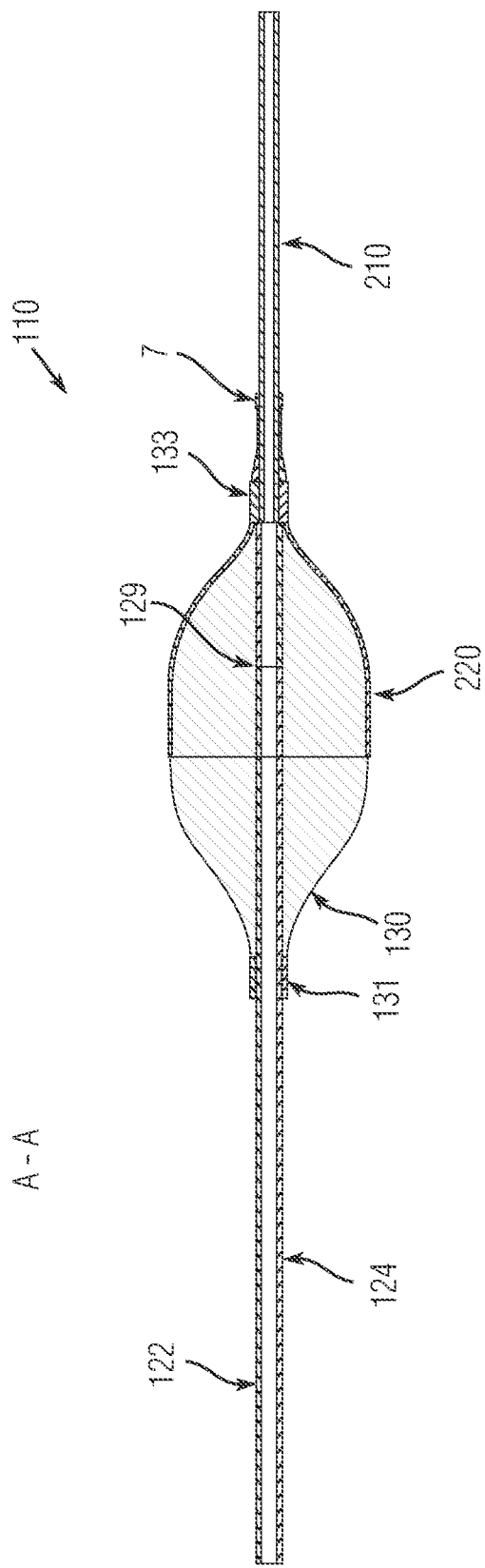
FIG. 2 is cross-sectional view taken along the line A-A of FIG. 1.

FIG. 1 is a side elevation view of the detachable tip sheathed balloon microcatheter 110, while FIG. 2 is a cross-sectional view of the detachable tip sheathed balloon microcatheter 110. FIGS. 3 and 4 illustrate the entire detachable balloon microcatheter system (assembly) 100 including the detachable tip sheathed balloon microcatheter 110.

The detachable balloon microcatheter 120 (first part of the detachable tip sheathed balloon microcatheter 110) comprises a dual catheter tube assembly (a catheter shaft) that generally has a proximal end 102 and an opposing distal end 104. The dual catheter tube nature of the detachable balloon microcatheter 120 results from the fact that it includes an outer catheter tube 122 and a separate inner catheter tube 124 that is inserted into a central lumen of the outer catheter tube 122. The outer catheter tube 122 and inner catheter tube 124 can thus be concentric with one another.

The detachable balloon microcatheter 120 has an inflatable member, such as an inflatable balloon 130 that is coupled to the outer catheter tube 122 and surrounds a portion of the outer catheter tube 122 and more particularly, the inflatable balloon 130 extends along a length of the distal portion of the outer catheter tube 122. As illustrated, the inflatable balloon 130 is attached at both its ends (proximal and distal ends) to the outer catheter tube 122.

Any number of different balloon configurations and materials (including compliant materials) can be used for the balloon 130. As described herein, the inflatable balloon 130 is inflated and deflated as a result of delivering of a fluid (most often a liquid) to the interior of the inflatable balloon 130 and conversely, the inflatable balloon 130 is deflated as a result of removal of the fluid from the interior of the balloon as discussed below.

For example, the balloon 130 can be made of any standard balloon materials such as PET, nylon, polyurethane, silicone, PEBAX, etc. although a low-compliance material is preferred to prevent risk of over-expansion of the balloon. The balloon 130 optimally is made of a material with optimal hysteresis and optical (maximal) elasticity to decrease the profile and return to its minimal deflated state. Also, in preferred embodiments, the balloon 130 is formed of a material that is DMSO and acrylic glue compatible.

The outer catheter tube 122 has a multi lumen construction in that it may contain multiple lumens or a co-axial double catheter design. In one embodiment, the outer catheter tube 122 includes a central lumen in which the inner catheter tube 124 is inserted and there are one or more and preferably several surrounding channels 125 (FIG. 7) for balloon inflation (fluid flowing within channels 125 flow into/out of the interior of the balloon 130). As will be readily understood, the lumens and channels in the outer catheter tube 122 can vary in their constructions and more particularly, the sizes (e.g., diameters) and/or shapes of the lumens/channels can vary. For example, one lumen/channel can have a greater diameter due to fluid carrying considerations, etc. Embolic agent is delivered through the inner catheter tube 124 (by flowing through the lumen thereof). In other words, the embolic agent is delivered centrally through the detachable balloon microcatheter 120.

Figure 7:
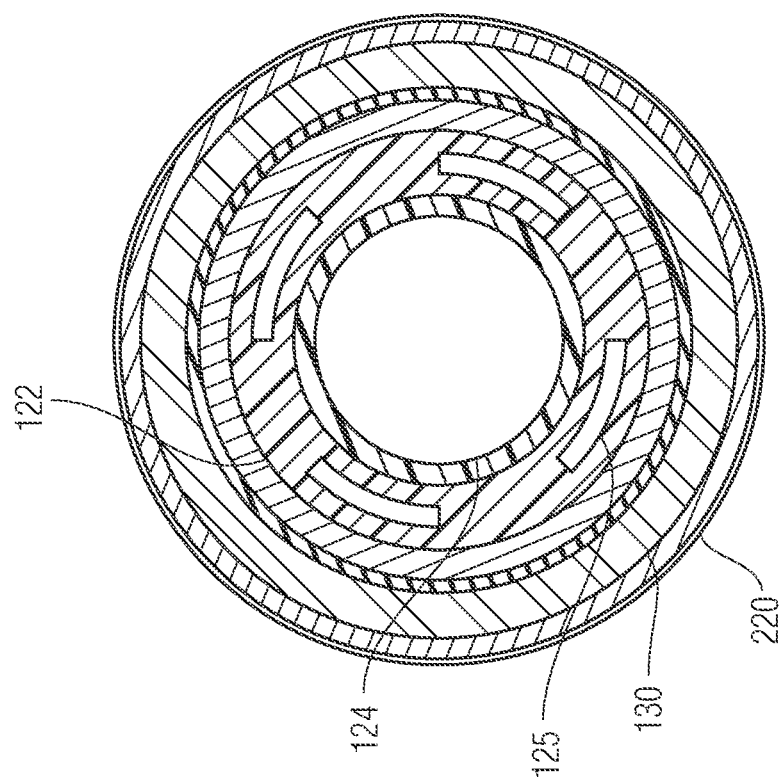
FIG. 7 is a cross-sectional view of the detachable tip sheathed balloon microcatheter.

As shown in FIG. 7, the balloon 130 is concentrically arranged relative to the outer catheter tube 122 and the inner catheter tube 124. The balloon 130 thus, at least in part, defines the distal end of the detachable balloon microcatheter 120. As shown in FIGS. 5 and 6, the inflatable balloon 130 can be placed in a fully deflated state (FIGS. 5 and 6) and a fully inflated state (FIGS. 1 and 2).

The detachable balloon microcatheter 120 includes a detachable tip assembly 200 that is formed at the distal end and represents the second part of the detachable tip sheathed balloon microcatheter 110. As described herein, the detachable tip assembly 200 is detachably coupled at its proximal end to the distal end of the detachable balloon microcatheter 120.

The detachable tip assembly 200 comprises a microcatheter tube 210 and a balloon sheath 220 and, as previously mentioned, the detachable tip assembly 200 is configured to be fitted into the distal end of the outer catheter tube 122 that is part of the detachable balloon microcatheter 120. More specifically, the proximal end portion of the microcatheter tube 210 is inserted into the outer catheter tube 122 so as to form a press-fit (mechanical coupling) between the two (i.e., the outer diameter of the microcatheter tube 210 is only slightly less than the inner diameter of the outer catheter tube 122 resulting in the friction fit (press fit)). The inner catheter tube 124 does not extend completely to the distal end of the outer catheter tube 122 but is offset therefrom. This offset allows for the microcatheter tube 210 to be inserted.

The detachable tip assembly 200 can make contact with inner catheter tube 124 at a contact point, generally indicated at 129 somewhere near mid-length of balloon 130 and as a result, and more particularly, the proximal end of the microcatheter tube 210 abuts the distal end of the inner catheter tube 124 so as to define a central continuous flow path for carrying and delivering the embolic agent. It will be understood that the microcatheter tube 210 is approximated but not mechanically attached in view of the fact that the inner catheter tube 124 and the microcatheter tube 210 separate when the detachment mechanism is deployed. The inner catheter tube 124 and the microcatheter tube 210 can have the same dimensions (diameters) and can be reversibly connected in using a suitable technique. Thus, when the detachable tip assembly 200 engages the detachable balloon microcatheter 120, embolic agent is delivered through the inner catheter tube 124 to the microcatheter tube 210.

The balloon 130 can be constructed from a tube sealed to the outer catheter tube 122 through radiopaque ring seals 131 and 133 and connected via holes to balloon lumens/channels 125 for inflation.

The microcatheter tube 210 is thus open at both of its ends to allow the embolic agent to flow from the inner catheter tube 124 into and along the microcatheter tube 210 before being discharged from the microcatheter tube 210 at its open distal end.

The balloon sheath 220 can be an ultra-elastic tube permanently attached to the outer surface of the microcatheter tube 210 via a radiopaque seal 230 and extends proximally to cover at least half of the length of the balloon 130. The opposite end of the balloon sheath 220 is an open end that at least partially surrounds the microcatheter tube 210 (with a portion of the balloon sheath 220 extending distal to the proximal end of the microcatheter tube 210). In other words, when the detachable tip assembly 200 is coupled to the detachable balloon microcatheter 120, the balloon sheath 220 is sized so that it surrounds roughly half of the balloon 130.

In one embodiment, the balloon sheath 220 is constructed from a tube of highly-compliant elastomer such as polyurethane, silicone or PEBAX. However, other materials can be used.

The detachable tip sheathed balloon microcatheter 110 includes a detachment mechanism to allow the detachable tip assembly 200 to be selectively and controllably detached from the detachable balloon microcatheter 120 for the reasons discussed herein. The detachment mechanism can thus be operated by a surgeon to retract at least a portion (outer catheter tube 122) of the detachable balloon microcatheter 120 from the surgical site, while keeping the inner catheter and detachable tip assembly 200 fixed causing the atraumatic relates of the tip (with minimal strain on the vessels).

It will be understood that the aforementioned type of detachment mechanism is merely exemplary and there are any number of other mechanisms that can be used, under certain circumstances, to controllably detach the detachable tip assembly 200 from the detachable balloon microcatheter 120. For example, other suitable detachment mechanism can be in the form of those detachment mechanisms that are used in other catheter systems that require distal detachment (e.g., detachable tip microcatheters, embolic coils, other detachable embolic devices used outside the neurovascular market), and include electrolytic, piezoelectric, chemical, and mechanical separation mechanisms. It will also be appreciated that the detachment mechanisms can be in the form of a mechanical based mechanism (e.g., push/pull mechanism) or can be an electro-mechanical mechanism or other types of mechanism that is configured to controllably detach the microcatheter 120 from the assembly 200.

In one embodiment, the force that is required to detach the microcatheter 120 from the assembly 200 is less than the force that is attaching the cape/detachable portion of the embolic agent. As mentioned, the attachment/detachment mechanism can consist of either a press-fitting of the detachable tip structure into the interface of the catheter or a radially tensioned mechanism that can be adjusted by the surgeon to relieve radial clamping tension on the detachable tip and facilitate removal without any additional tension applied to the catheter.

In the illustrated detachment mechanism, the balloon 130 is controlled by the clinician (surgeon) injecting fluid through the injection port 301 on the y-adaptor 300. It will be readily appreciated that since the protective balloon sheath 220 surrounds the balloon 130, the inflation and deflation of the balloon 130 directly controls movement of and the state of the balloon sheath 220. Thus, as shown in FIGS. 1 and 2, when the balloon 130 is fully inflated, the protective balloon sheath 220 is likewise outwardly extended and in an extended state and conversely, when the balloon 130 is fully deflated, the sheath 220 is in a collapsed state.

The protective balloon sheath 220 thus also expands and contracts with the balloon 130. Inflation and deflation of the balloon 130 allows flow control preventing reflux of embolic agent on non-targeted vessels. The balloon sheath 220 prevents attachment of Onyx™ or other cohesive or adhesive embolic agent directly to the balloon or to the detachment interface since the balloon sheath 220 covers the distal end of the balloon 130 which is the area that the embolic agent would contact in the event that the balloon sheath 220 was not present. The sheath 220 thus protects the balloon 130 from contact with the embolic agent, thereby eliminating the chance that the embolic agent contacts and bonds to the balloon material. In other words, the procedure is performed and controlled such that there is no reflux proximal to the sheath 220 or a radiopaque mark can be utilized to prevent the embolic agent (e.g., adhesive glue) from fixing the sheath 220 to the balloon 130.

As described in more detail herein, the embolic agent is delivered to the treatment site but delivering the embolic agent through the proximal hub into the inner catheter tube 124 and then subsequently into the microcatheter tube 210 from which it is ultimately discharged from the distal end of the microcatheter tube 210.

After completion of embolic agent delivery, the balloon 130 is deflated and the balloon 130 and the outer catheter tube 122 are retracted over the inner catheter tube 124 via rotation of thumb nut 320, releasing the detachable tip assembly 200 (formed of from the outer catheter tube 122 in the manner described herein.

Figure 8:
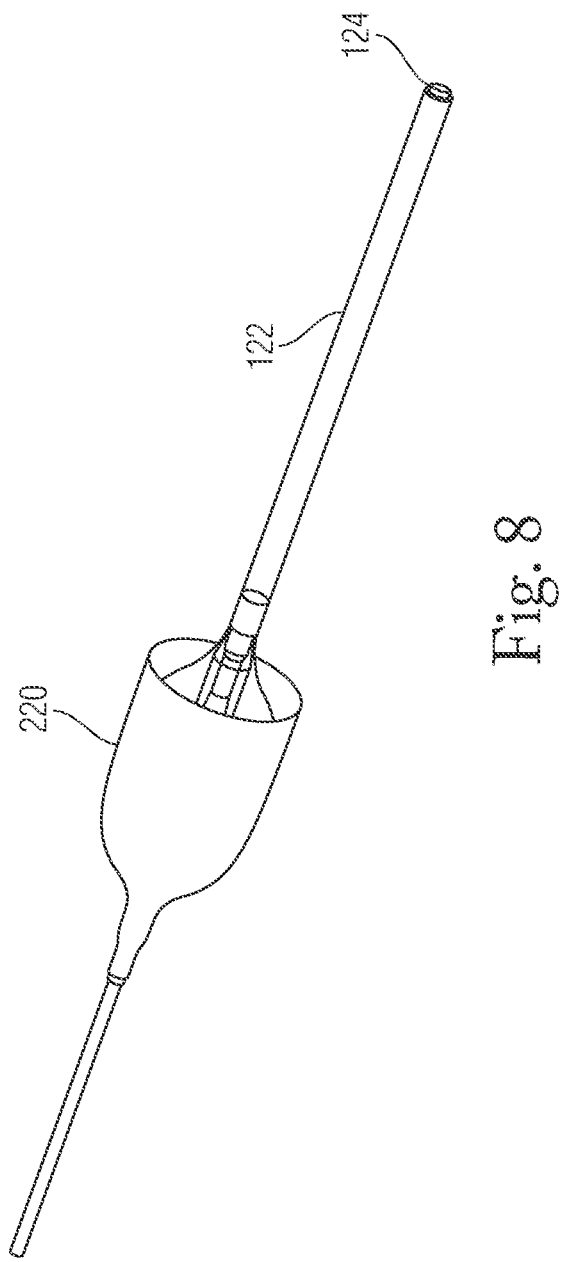
FIG. 8 is a side perspective view of the detachable tip sheathed balloon microcatheter according to another embodiment with an extended protective balloon sheath.

It will be understood that the detachable tip sheathed balloon microcatheter 110 can be constructed so as to have different embodiments than that shown in FIGS. 1-7. For example, and as illustrated in FIG. 8, the protective sheath 220 can be of an extended nature in that the tubular structure of the protective sheath 220 can be extended closer to the proximal end of the balloon 130, to help counteract the forward force on the tip that may otherwise be forced forward by the balloon 130 and detached prematurely.

In addition, one or more expanding wire structures (rings) can be embedded in a section of the protective balloon sheath 220 for helping to reduce this pushing force and provide extra friction between the balloon 130 and the balloon sheath 220 when the balloon 130 is expanded, further helping to prevent premature release of the detachable tip assembly 200.

Figure 9:
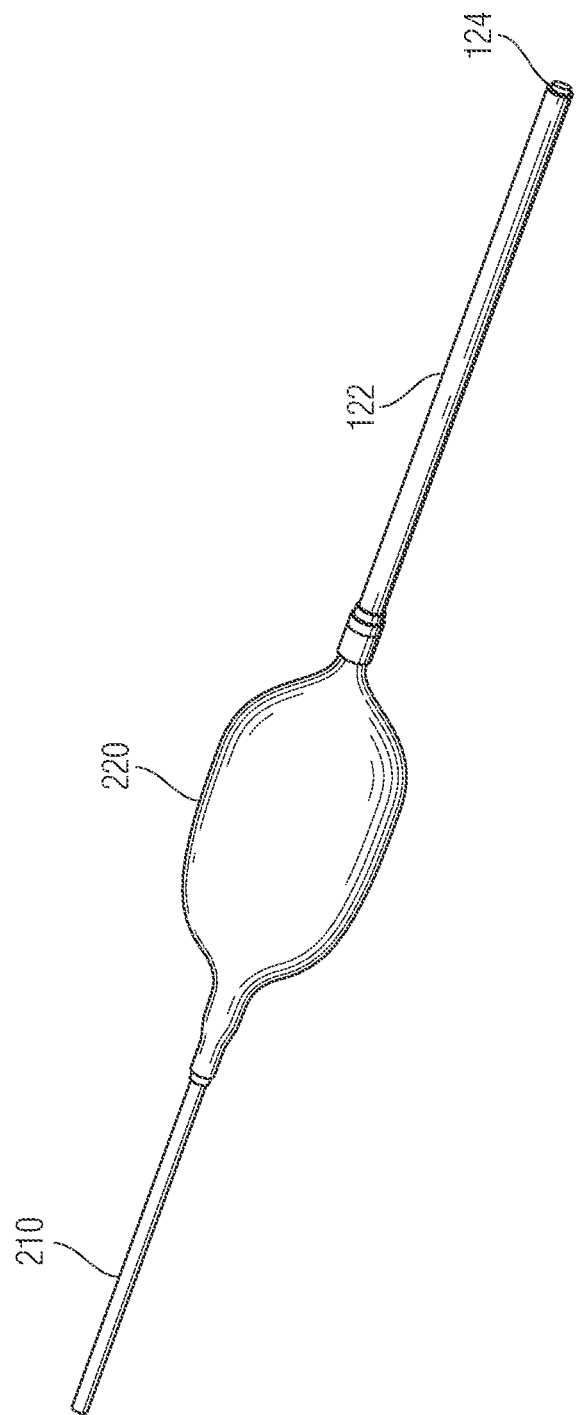
FIG. 9 is a side perspective view of the detachable tip sheathed balloon microcatheter according to another embodiment with a protective balloon sheath that covers the entire balloon.

In another embodiment that is shown in FIG. 9, the elastomeric balloon sheath 220 is configured to surround the entire balloon (not shown), with the proximal end of the sheath 220 including a less-elastic and/or thicker ring section that resists expansion, preventing the balloon 130 from pushing the protective sheath 220 forward and detaching the tip assembly 200 prematurely.

Figure 10:
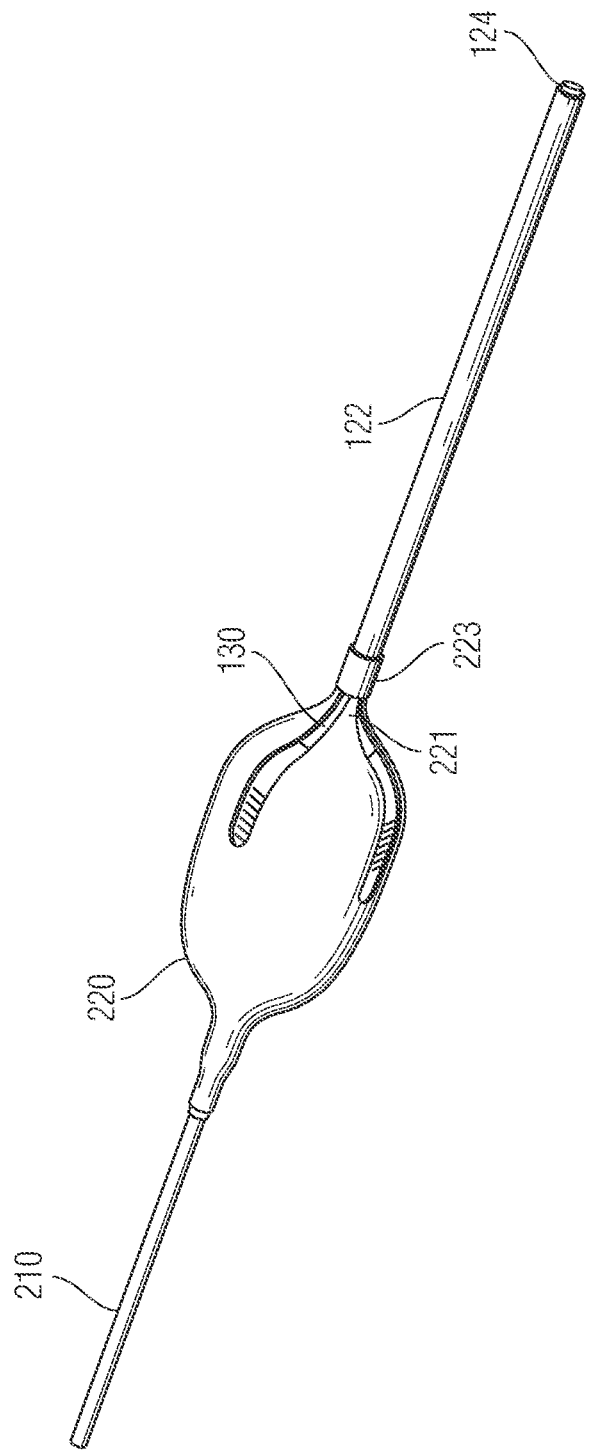
FIG. 10 is a side perspective view of the detachable tip sheathed balloon microcatheter according to another embodiment with a protective balloon sheath that includes impinged strips.

In yet another embodiment illustrated in FIG. 10, an elastomeric balloon sheath 220 covers the entire balloon 130, with the proximal end of the balloon sheath 220 being divided into strips 221 that are impinged by a ring 223 above the balloon seal. The ring 223 is pulled off of the strips 221 when the balloon microcatheter is retracted off of the tip, allowing the balloon microcatheter to slide out of the sheath 220.

In each of the exemplary embodiments described herein, the sheath 220 and the distal tip structure itself can be formed from polymeric materials with high affinity to form covalent bonds with ethylene vinyl alcohol copolymer, which is formulation of the Onyx™ adhesive embolic agent. This attraction between the sheath 220 and the Onyx™ adhesive embolic agent or other agent promotes the two to adhere to one another within the blood vessel such that detachment of the of the distal tip is achieved more cleanly. In addition, the material of the balloon 130 is preferably chemically dissimilar to the material that is used form the sheath 220 and the distal tip structure, thereby reducing the bonding affinity between the balloon 130 and the sheath 220/distal tip structure versus the Onyx™ adhesive embolic agent. In one embodiment, the sheath 220 is formed of ethylene and/or hydrophobic materials that adhere to the Onyx™ adhesive embolic agent and in one embodiment, the balloon 130 is formed of low-density polyethylene.

Exemplary Method of Use

FIGS. 11A-11H show one exemplary use case of the detachable-tip balloon microcatheter system (assembly) 100 in the brain (e.g., in a vessel) and further illustrates its benefits compared to conventional balloon catheters and detachable tip catheters alone.

As shown in FIG. 11A, once the clinician identifies the AVM in the brain, the sheath-protected balloon microcatheter will be navigated within the target blood vessel. As shown in FIG. 11B, after microcatheter selection of target vessel, the clinician expands the balloon 130 to secure the device in the artery or vein either feeding or draining the nidus of the AVM, respectively. Expansion of the balloon 130 (by contrast material delivery thereto) causes synchronous expansion of the protective sheath 220. As shown in FIG. 11C, the clinician then begins to inject the embolic agent (e.g., Onyx™)(identified as "EA") by delivering the embolic agent through the inner catheter tube 124. As shown in FIG. 11D, reflux of the embolic agent from the injection of the embolic agent creates a cast that around the detachable tip assembly 200 effectively preventing reflux on normal vasculature. This step obviates the need for creation of a proximal plug by reflux alone of the embolic agent (e.g., Onyx™) reducing the risk of complications described earlier (i.e., catheter entrapment) due to proximal reflux of the embolic agent (e.g., Onyx™).

As shown in FIG. 11E, the clinician conducts a continuous AVM injection until the AVM is obliterated. Once the embolization procedure is complete (FIG. 11F), the clinician deflates the balloon 130 and as shown in FIG. 11G, the clinician mechanically retracts the outer catheter tube 122 with balloon 130 over the inner catheter tube 124 separating the detachable tip assembly 200 from the detachable balloon microcatheter 120. As shown in FIG. 11H, the detached tip assembly 200 remains firmly embedded in the embolic agent (Onyx™) cast. Finally, the clinician removes the main catheter from the patient.

As shown in FIGS. 11A-11H, the protective balloon sheath 220 prevents dangerous reflux of the embolization agent and spillage into adjacent blood vessels. The balloon sheath 220 facilitates the formation of a cast around the microcatheter tip (assembly 200). The entire procedure facilitates comprehensive injection of the embolic agent prevents catheter entrapment and reduces procedure time.

It will be understood that process depicted in FIGS. 11A-11H does not specify if access to the AVM is made through the artery or through a vein. The present invention described herein can be utilized in both transvenous and transarterial embolization procedures.

FIGS. 12A-12D are cross-sectional views of alternative detachable tip sheathed balloon microcatheters that can be used in accordance with the practice of the present invention. FIGS. 13A-13D are perspective views of the microcatheters shown in FIGS. 12A-12D. In general, the microcatheter includes two lumens, namely, a first lumen for the embolic agent and one for the inflation fluid for controlling the inflation and deflation of the balloon. FIGS. 12A and 13A illustrate the previously described embodiment in which the catheter comprises the outer catheter tube 122 and the inner catheter tube 124, with the inflation fluid (e.g., saline) passing between the inner diameter of the outer catheter tube 122 and the outer diameter of the inner catheter tube 124. FIGS. 12B and 13B illustrate a microcatheter that is formed of a catheter body 400 that includes a main lumen 401 that is preferably centrally located and a plurality of secondary lumens 410 that are formed within the catheter body 410. While the secondary lumens 410 are shown as having the same shape and size (circular with same diameter), it will be appreciated that lumens 410 can have difference shapes and/or sizes. Also, the lumens 410 are shown as generally being grouped together; however, the lumens 410 do not have to grouped together and one or more of the lumens can be separated from the others. The secondary lumens 410 are located adjacent the main lumen 401. FIGS. 12C and 13C show an embodiment in which there is only a single secondary lumen 410 formed in the catheter body 410. FIGS. 12D and 13D illustrate a microcatheter formed of a catheter body 500 with a main lumen 501 formed therein. In this embodiment, a secondary lumen 510 is defined within a tubular structure 512 that is located adjacent the main lumen 501. As shown, the tubular structure 512 extends longitudinally along the main catheter body 500 and can be integrally formed therewith, as illustrated, or can be a separate part that is coupled to the main catheter body 500 using traditional techniques. The secondary lumen 510 is intended to carry the balloon inflation fluid.

It will also be appreciated that other microcatheter constructions can be used in accordance with the present invention and the ones disclosed and described herein are only exemplary and not limiting of the present invention.

It will be appreciated that the inclusion of the sheath 220 in the current system serves several purpose in that the sheath 220 shields the catheter balloon but it does more than that in that without the sheath 220, detachment of the two subassemblies would not be generally possible since the embolic agent (e.g., Onyx) would reflux onto the detachment mechanism and thereby bind such system and prevents detachment of these two subassemblies. In other words, the sheath 220 not only provides shielding (protection) of the balloon 130 but it also shields (protects) the detachment mechanism and prevents the embolic agent from contacting the detachment mechanism and binding to it so as to render it inoperable. The incorporation of sheath 220 enables a short throw of the distal end effector of the device, further compacting its function so the entire device is as proximal as possible to the disease (target site), which improves efficacy. The protected balloon 130 is therefore enabled to do what balloons do best, namely, control and occlude flow dynamically at the target site.

The present invention is directed to systems and methods for treatment of patients diagnosed with arteriovenous malformations. The improved technology described herein increases the efficiency of embolization, reduces undesirable complications due to reflux, insufficient embolization of nidus, and entrapment of the catheter. One exemplary embodiment of the new technology is a single body double lumen microcatheter that is DMSO and NBCA compatible, includes a detachable-tip and balloon protective sheath and makes unnecessary the double catheter techniques applied to conventional transvenous and transarterial catheterization. As mentioned herein, the present technology can be extended to embolization of non-cerebral AVMs. The present improved technology will improve the health outcomes of patients with AVMs by facilitating complete occlusion and limiting procedural risks. Furthermore, condensing the dual-catheter embolization technique into a single device will allow for improved time efficiency intra-procedurally and overall improvement in healthcare cost savings.

It will also be appreciated that while a balloon microcatheter is described herein as being one exemplary means for expanding the sheath, other means can be used to cause an expansion (opening) of the sheath. For example, a catheter with a mechanical device or mechanism at the distal end can be used and upon actuation, the device is configured to apply an outward radial force to the sheath to cause the sheath to open in the manner described herein. In addition, the use of memory materials can be used to radially expand the sheath. For example, in an at rest position, the memory material can have an expanded annular shape for contacting and driving the sheath to the open position; however, the memory material can be causes to collapse into a collapsed state as by a mechanical mechanism (actuator). Other devices/actuators can be used to cause the controlled radial expansion of the sheath, while still allowing delivery of the embolic agent to the target location as by passage through a center lumen. In these other embodiments, the sheath also shields these devices from the embolic agent that is ejected to allow for detachment of the detachable tip part that contains the sheath from the other device.

It is to be understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Overall, the subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A detachable tip sheathed balloon microcatheter for delivering an embolic agent to a target location comprising:
   a balloon microcatheter including a first shaft and an inflatable balloon that is coupled to a distal end portion of the first shaft; and
   a detachable tip assembly that is configured to be detachably coupled to the first shaft of the balloon microcatheter, the detachable tip assembly including a protective balloon sheath that is coupled to a proximal end portion of a second shaft that is a separate part relative to the protective balloon sheath, the proximal end portion of the second shaft extending internally within the protective sheath and terminating at a location that is between two opposing ends of the protective sheath, wherein when the detachable tip assembly is coupled to the balloon microcatheter, the protective balloon sheath surrounds at least a portion of the inflatable balloon.

2. The detachable tip sheathed balloon microcatheter of claim 1, wherein the first shaft includes an outer catheter tube and an inner catheter tube received within a central lumen of the outer catheter tube.

3. The detachable tip sheathed balloon microcatheter of claim 2, wherein a distal end of the inner catheter tube is offset in a proximal direction from a distal end of the outer catheter tube.

4. The detachable tip sheathed balloon microcatheter of claim 2, wherein the inflatable balloon is coupled to the outer catheter tube at a first proximal location and a second distal location spaced distally from the first proximal location, the inflatable balloon having a fully collapsed state and a fully inflated state.

5. The detachable tip sheathed balloon microcatheter of claim 2, wherein the second shaft comprises a tubular structure that is configured to be received into and securely held within the outer catheter tube.

6. The detachable tip sheathed balloon microcatheter of claim 5, wherein the second shaft is held within the outer catheter tube by a press fit.

7. The detachable tip sheathed balloon microcatheter of claim 2, wherein an inner diameter of the inner catheter tube and an inner diameter of the second shaft are the same.

8. The detachable tip sheathed balloon microcatheter of claim 1, wherein the protective balloon sheath is formed of a material that can both expand and contract due to inflation and deflation, respectively, of the inflatable balloon.

9. The detachable tip sheathed balloon microcatheter of claim 1, wherein the protective balloon sheath is formed of an elastic walled tube that surrounds the inflatable balloon and is configured to protect the inflatable balloon from interaction with the embolic agent and facilitates formation of a cast at least partially around the protective balloon sheath.

10. The detachable tip sheathed balloon microcatheter of claim 1, wherein the inflatable balloon is formed of a low-compliance material and the protective balloon sheath is formed of a high-compliance material.

11. The detachable tip sheathed balloon microcatheter of claim 1, wherein the inflatable balloon is formed a material selected from the group consisting of: PET, nylon, polyurethane, silicone, and PEBAX, and the protective balloon sheath is formed of a highly-compliant elastomer selected from the group consisting of polyurethane, silicone and PEBAX.

12. The detachable tip sheathed balloon microcatheter of claim 1, further including a detachment mechanism for controllably detaching the balloon microcatheter from the detachable tip assembly.

13. The detachable tip sheathed balloon microcatheter of claim 1, wherein the portion of the inflatable balloon covered by the protective balloon sheath comprises a substantial length of the inflatable balloon.

14. The detachable tip sheathed balloon microcatheter of claim 1, wherein the portion of the inflatable balloon covered by the protective balloon sheath comprises an entire length of the inflatable balloon.

15. The detachable tip sheathed balloon microcatheter of claim 14, wherein a proximal end region of the protective balloon sheath is divided into strips that are impinged by a ring above a first seal between the inflatable balloon and the first shaft.

16. The detachable tip sheathed balloon microcatheter of claim 1, wherein the first shaft comprises a single catheter shaft body with a main lumen formed therein and at least one secondary lumen formed in the catheter shaft body spaced from the main lumen.

17. The detachable tip sheathed balloon microcatheter of claim 16, wherein the at least one secondary lumen comprises a plurality of secondary lumens.

18. The detachable tip sheathed balloon microcatheter of claim 1, wherein the first shaft comprises a main catheter shaft body with a main lumen formed therein and a secondary tubular structure that is adjacent to and extends longitudinally along the main catheter shaft body and includes a secondary lumen that is spaced from the main lumen.

19. The detachable tip sheathed balloon microcatheter of claim 1, wherein the detachable tip assembly including the protective balloon sheath is formed of a polymeric material with high affinity to form covalent bonds with the embolic agent that is formed of ethylene vinyl alcohol copolymer.

20. A detachable tip sheathed balloon microcatheter for delivering an embolic agent to a target location comprising:
  a balloon microcatheter including a first shaft and an inflatable balloon that is coupled to a distal end portion of the first shaft; and
  a detachable tip assembly that is configured to be detachably coupled to the first shaft of the balloon microcatheter, the detachable tip assembly including a protective balloon sheath that is coupled to a proximal end portion of a second shaft, wherein when the detachable tip assembly is coupled to the balloon microcatheter, the protective balloon sheath surrounds at least a portion of the inflatable balloon, wherein the first shaft includes an outer catheter tube and an inner catheter tube received within a central lumen of the outer catheter tube;
  wherein the second shaft comprises a tubular structure that is configured to be received into and securely held within the outer catheter tube
  wherein the protective balloon sheath extends proximally beyond a proximal end of the second shaft; and
  wherein when the detachable tip assembly is coupled to the balloon microcatheter, the proximal end of the second shaft abuts a distal end of the inner catheter tube at a location at which the inflatable balloon is in a surrounding relationship.

21. A detachable tip sheathed balloon microcatheter for delivering an embolic agent to a target location comprising:
  a balloon microcatheter including a first shaft and an inflatable balloon that is coupled to a distal end portion of the first shaft; and
  a detachable tip assembly that is configured to be detachably coupled to the first shaft of the balloon microcatheter, the detachable tip assembly including a protective balloon sheath that is coupled to a proximal end portion of a second shaft, wherein when the detachable tip assembly is coupled to the balloon microcatheter, the protective balloon sheath surrounds at least a portion of the inflatable balloon,
  wherein the first shaft includes an outer catheter tube and an inner catheter tube received within a central lumen of the outer catheter tube; and
  a detachment mechanism for controllably detaching the balloon microcatheter from the detachable tip assembly, wherein the detachment mechanism comprises a sliding catheter-detachment mechanism that is configured, when actuated, to retract the outer catheter tube relative to the inner catheter tube, thereby releasing the detachable tip assembly after a limit of motion is reached.

22. The detachable tip sheathed balloon microcatheter of claim 21, wherein the detachment mechanism is configured such that retraction of the outer catheter tube results in retraction of the inflatable balloon in a deflated state relative to the protective balloon sheath which remains in an expanded state as a result of a cast formed around the detachable tip assembly, the cast being formed of the embolic agent.

23. A detachable tip sheathed balloon microcatheter for delivering an embolic agent to a target location comprising:
  a balloon microcatheter including a first shaft and an inflatable balloon that is coupled to a distal end portion of the first shaft; and
  a detachable tip assembly that is configured to be detachably coupled to the first shaft of the balloon microcatheter, the detachable tip assembly including a protective balloon sheath that is coupled to a proximal end portion of a second shaft, wherein when the detachable tip assembly is coupled to the balloon microcatheter, the protective balloon sheath surrounds at least a portion of the inflatable balloon; and
  wherein a proximal end region of the protective balloon sheath comprises a section having less elasticity relative to other regions including a distal end of the protective balloon sheath such that the proximal end region resists expansion, thereby preventing the inflatable balloon from pushing the protective balloon sheath forward and detaching the tip assembly prematurely.

* * * * *